(12) United States Patent
Raffle et al.

(10) Patent No.: US 9,746,915 B1
(45) Date of Patent: Aug. 29, 2017

(54) METHODS AND SYSTEMS FOR CALIBRATING A DEVICE

(71) Applicants: Hayes Solos Raffle, Mountain View, CA (US); Thad Eugene Starner, Mountain View, CA (US); Mat Balez, Mountain View, CA (US); Michael Patrick Johnson, Mountain View, CA (US); Yong Zhao, Mountain View, CA (US); Bo Wu, Mountain View, CA (US); David Sparks, Mountain View, CA (US); Nirmal J. Patel, Mountain View, CA (US)

(72) Inventors: Hayes Solos Raffle, Mountain View, CA (US); Thad Eugene Starner, Mountain View, CA (US); Mat Balez, Mountain View, CA (US); Michael Patrick Johnson, Mountain View, CA (US); Yong Zhao, Mountain View, CA (US); Bo Wu, Mountain View, CA (US); David Sparks, Mountain View, CA (US); Nirmal J. Patel, Mountain View, CA (US)

(73) Assignee: Google Inc., Mountain View, CA (US)

( * ) Notice: Subject to any disclaimer, the term of this patent is extended or adjusted under 35 U.S.C. 154(b) by 374 days.

(21) Appl. No.: 13/657,492

(22) Filed: Oct. 22, 2012

(51) Int. Cl.
 *G06F 3/01* (2006.01)

(52) U.S. Cl.
 CPC ..................... *G06F 3/013* (2013.01)

(58) Field of Classification Search
 USPC ........................................................ 345/173
 See application file for complete search history.

(56) References Cited

U.S. PATENT DOCUMENTS

| 4,081,623 A | 3/1978 | Vogeley |
| 5,360,971 A | 11/1994 | Kaufman |
| 7,657,062 B2 | 2/2010 | Pilu |
| 2005/0047662 A1* | 3/2005 | Gorodnichy ............ G06T 7/254 382/218 |
| 2005/0225723 A1* | 10/2005 | Pilu ........................ A61B 3/113 351/209 |

(Continued)

OTHER PUBLICATIONS

Shaviv, The Design and Improvement of an Eye Controlled Interface.

*Primary Examiner* — Jennifer Mehmood
*Assistant Examiner* — Carl Adams
(74) *Attorney, Agent, or Firm* — McDonnell Boehnen Hulbert & Berghoff LLP

(57) ABSTRACT

Examples of methods and systems for providing calibration for eye gesture recognition are described. In some examples, calibration can be executed via a head-mountable device. A method for calibration of a system may account for changes in orientation of the head-mountable device, update recognition of the eye gestures, or increase efficiency of the system, for example. The head-mountable device may be configured to receive signals indicative of eye gestures from an eye gesture-detection system and in response to receiving a second command confirming that the signal is indicative of an eye gesture command, to make adjustments to the eye gesture recognition system and/or the reference signals. The head-mountable device may calibrate an eye gesture recognition system via implicit or explicit calibration, for example.

22 Claims, 6 Drawing Sheets

(56) References Cited

U.S. PATENT DOCUMENTS

| | | | |
|---|---|---|---|
| 2006/0039686 A1* | 2/2006 | Soh | G06K 9/00335 396/18 |
| 2007/0035513 A1* | 2/2007 | Sherrard | G06F 3/04817 345/157 |
| 2010/0182232 A1* | 7/2010 | Zamoyski | G06F 3/013 345/157 |
| 2011/0128364 A1* | 6/2011 | Ono | G02B 27/017 348/78 |
| 2011/0175932 A1* | 7/2011 | Yu | G06F 3/013 345/661 |
| 2012/0159330 A1* | 6/2012 | Jeong | G06F 3/017 715/716 |
| 2012/0243689 A1* | 9/2012 | Jeong | G06T 7/2053 381/17 |
| 2013/0044055 A1* | 2/2013 | Karmarkar | G06F 3/013 345/158 |
| 2013/0257709 A1* | 10/2013 | Raffle | G06F 3/013 345/156 |
| 2013/0258287 A1* | 10/2013 | Pugh | A61B 5/1103 351/210 |

* cited by examiner

METHODS AND SYSTEMS FOR CALIBRATING A DEVICE

BACKGROUND

Computing devices such as personal computers, laptop computers, tablet computers, cellular phones, and countless other types of Internet-capable devices are becoming increasingly prevalent in numerous aspects of modern life. Over time, the manner in which these devices are providing information to users is becoming more intelligent, more efficient, more intuitive, and less obtrusive. With advancements in technology, computing devices continue to become smaller and more adaptable. Some computing devices, such as wearable computing devices, enable a user to have hands free use while operating the device.

In some examples, wearable computing devices are able to place miniature image display elements close enough to the eyes of a user such that the displayed image fills or nearly fills the field of view of the user. To the user, the displayed image appears as a normal sized image, such as might be displayed on a traditional image display. The relevant technology may be referred to as "near-eye displays." Near-eye displays are fundamental components of wearable displays, such as on a head-mountable device (HMD). An HMD may place a graphic display close to one or both of the wearer's eyes and enable a user to use eye gestures to send commands to the HMD to execute tasks.

SUMMARY

This disclosure may disclose, inter alia, methods and systems to provide calibrations for eye gesture recognition.

In one example, a method is provided that includes receiving a signal indicative of a detected eye gesture from a device coupled to a head-mountable device (HMD). The method also includes making a comparison of the signal to a reference signal and based on the comparison, making a determination of whether the signal is indicative of an eye gesture command. The method comprises that the HMD is configured to perform a predefined task in response to the eye gesture command. The method further comprises adjusting one or more parameters of the reference signal based on one or more parameters of the signal based on receiving a second command executable by the HMD to perform a subsequent task based on the predefined task.

In another example, an additional method is provided that includes receiving a signal indicative of a detected eye gesture from a device coupled to a head-mountable device (HMD). The method also comprises making a comparison of the signal to a reference signal and based on the comparison, making a determination of whether the signal is indicative of an eye gesture command. The method further comprises that the HMD is configured to perform a predefined task in response to the eye gesture command. The method concludes with adjusting one or more parameters of the reference signal based on one or more parameters of the signal.

In yet another example, an example system is described. The system comprises an HMD configured to receive a signal indicative of a detected eye gesture from a device coupled to the HMD, a computer-readable medium, and program instructions stored on the computer-readable medium and executable by at least one processor to perform functions. In the example system, the functions include receiving a signal indicative of a detected eye gesture from a device coupled to an HMD and making a comparison of the signal to a reference signal. The functions further comprise making a determination of whether the signal is indicative of an eye gesture command based on the comparison with the HMD is configured to perform a predefined task in response to the eye gesture command. In addition, the functions include based on receiving a second command executable by the HMD to perform a subsequent task based on the predefined task, adjusting one or more parameters of the reference signal based on one or more parameters of the signal.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in any processes or methods described herein.

The foregoing summary is illustrative only and is not intended to be in any way limiting. In addition to the illustrative aspects, examples, and features described above, further aspects, examples, and features will become apparent by reference to the figures and the following detailed description.

DETAILED DESCRIPTION

Figure 1A:
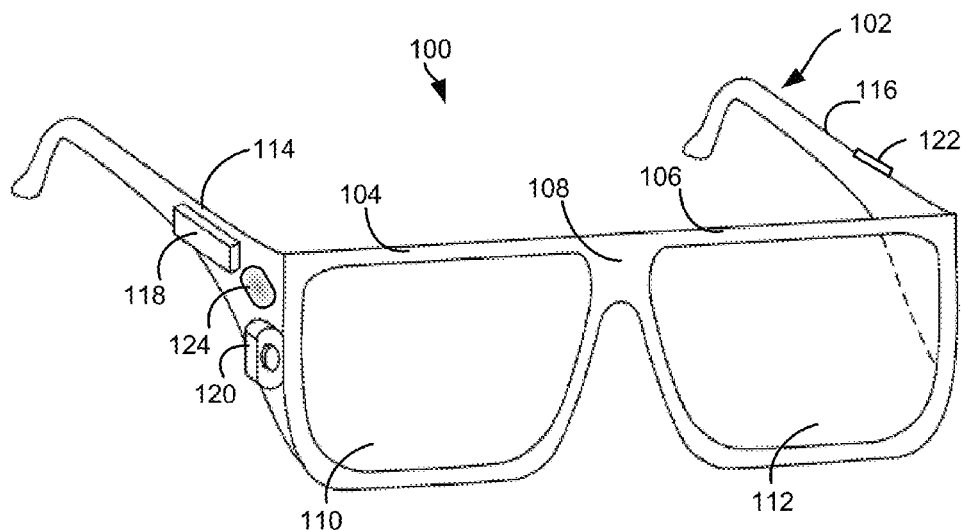
FIGS. 1A and 1B illustrate an example of a wearable computing device.

In the following detailed description, reference is made to the accompanying figures, which form a part thereof. In the figures, similar symbols typically identify similar components, unless context dictates otherwise. The illustrative examples described in the detailed description, figures, and claims are not meant to be limiting. Other examples may be utilized, and other changes may be made, without departing from the scope of the subject matter presented herein. It will be readily understood that the aspects of the present disclosure, as generally described herein, and illustrated in the figures, may be arranged, substituted, combined, separated, and designed in a wide variety of different configurations, all of which are contemplated herein.

Within examples, this disclosure relates to methods and systems for providing calibration for eye gesture recognition that is associated with a head-mountable device (HMD), such as a glasses-style wearable computing device. An HMD may include an eye gesture-detection system, which may detect eye gestures from a wearer of the HMD. In response to detecting an eye gesture, the HMD may receive a signal indicative of parameters of the detected eye gesture. The HMD may be configured to compare this signal with reference signals that are indicative of parameters of eye gesture commands recognizable by the HMD to determine if the received signal represents an eye gesture command. Based on the comparison, the HMD may be configured to perform different predefined tasks in response to determining that a received signal is indicative a recognizable eye gesture command. Thus, the HMD may perform various predefined tasks based on the different types of eye gesture commands received.

Eye gestures and execution of tasks may have or may be associated with different parameters. However, individual eye gestures of the same type may have similar parameters, and thus, similarities may be recognized during a comparison. In addition, the HMD may be configured to determine different levels of confidence and to execute tasks differently based on comparison between received signals and reference signals.

Based on performing comparisons of detected eye gestures with reference eye gestures, an HMD may be configured to make adjustments to a reference signal, such as adjusting the parameters that indicate a signal is an eye gesture command. An HMD may adjust the parameters of a reference signal to reflect the parameters of a received signal that was determined to be indicative of an eye gesture command, allowing the HMD to calibrate the eye gesture recognition system and to recognize variations of an eye gesture command through learned experience.

In one example, an HMD may be configured to receive a second command prior to adjusting any parameters of a reference signal, where the second command includes a request for the HMD to perform a subsequent task based on the predefined task that the HMD executed in response to the first eye gesture command. In this way, the HMD may confirm that an eye gesture command was properly determined from the received signal since the HMD received the second command, and thus, may then proceed to calibrate the eye gesture recognition system to reflect the confirmation. An HMD may be configured to receive additional commands to confirm a received signal in fact represented an eye command from the wearer in cases where the eye gesture may often include involuntary gestures, or noise may result in the HMD receiving a similar signal, for example.

In another example, an HMD may be configured to adjust a reference signal without receiving a second command that confirms that the HMD properly received the first eye gesture command. In some instances, the HMD may be configured to calibrate the eye recognition system after receiving certain or predefined eye gestures, such as a double blink. Since double blinks rarely occur involuntarily, the HMD may be configured to determine that the parameters of the signal received in response to a double blink may most likely represent a double blink eye gesture command from the wearer, and thus, allow for the HMD to make adjustments to the parameters of the reference signal for a double blink eye gesture to recognize the parameters of the received double blink in future repetitions. Thus, an HMD may be configured to calibrate according to various eye gestures in different ways.

Referring now to the figures, FIG. 1A illustrates an example for a wearable computing device 100. While FIG. 1A illustrates a head-mountable device (HMD) 102 as an example of a wearable computing device, other types of wearable computing devices may additionally or alternatively be used. As illustrated in FIG. 1A, the HMD 102 comprises frame elements, including lens frames 104, 106, and a center frame support 108, lens elements 110, 112, and extending side arms 114, 116. The center frame support 108 and the extending side arms 114, 116 are configured to secure the HMD 102 to a user's face via a user's nose and ears.

Each of the frame elements 104, 106, and 108 and the extending side arms 114, 116 may be formed of a solid structure of plastic and/or metal, or may be formed of a hollow structure of similar material so as to allow wiring and component interconnects to be internally routed through the HMD 102. Other materials may be used as well.

One or more of each of the lens elements 110, 112 may be configured of any material that may suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side arms 114, 116 may each be protrusions that extend away from the lens frames 104, 106, respectively, and may be positioned behind the ears of a user to properly secure the HMD 102 to the user. The extending side arms 114, 116 may further secure the HMD 102 to the user by extending around a rear portion of the head of the user. Additionally or alternatively, for example, the wearable computing system 100 may connect to or be affixed within a head-mountable helmet structure. Other possibilities exist as well.

The HMD 102 may additionally include an on-board computing system 118, a video camera 120, a sensor 112, and a finger-operable touch pad 124. The on-board computing system 118 is shown to be positioned on the extending side arm 114 of the HMD 102. The on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the video camera 120 and the finger-operable touch pad 124 (and possibly from other sensory devices, user interfaces, or both) and generate images for output by the lens elements 110 and 112.

With continued reference to FIG. 1A, the video camera 120 is shown positioned on the extending side arm 114 of the HMD 102; however, the video camera 120 may be provided on other parts of the HMD 102. The video camera 120 may be configured to capture image data at various resolutions or at different frame rates. One or multiple video cameras with a small form factor, such as those used in cell phones or webcams, for example, may be incorporated into the HMD 102.

Further, although FIG. 1A illustrates one video camera 120, more video cameras may be used, and each may be configured to capture the same view, or to capture different views. For example, the video camera 120 may be forward facing to capture at least a portion of the real-world view perceived by the user. The image data captured by the video camera 120 may then be used to generate an augmented reality where computer generated images appear to interact with the real-world view perceived by the user.

The sensor 122 is shown on the extending side arm 116 of the HMD 102; however, the sensor 122 may be positioned on other parts of the HMD 102. The sensor 122 may include one or more of a gyroscope, an accelerometer, or a proximity sensor, for example. Other sensing devices may be included within, or in addition to, the sensor 122 or other sensing functions may be performed by the sensor 122.

The finger-operable touch pad 124 is shown on the extending side arm 114 of the HMD 102. However, the finger-operable touch pad 124 may be positioned on other parts of HMD 102. Also, more than one finger-operable touch pad may be present on the HMD 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent of transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

Figure 1B:
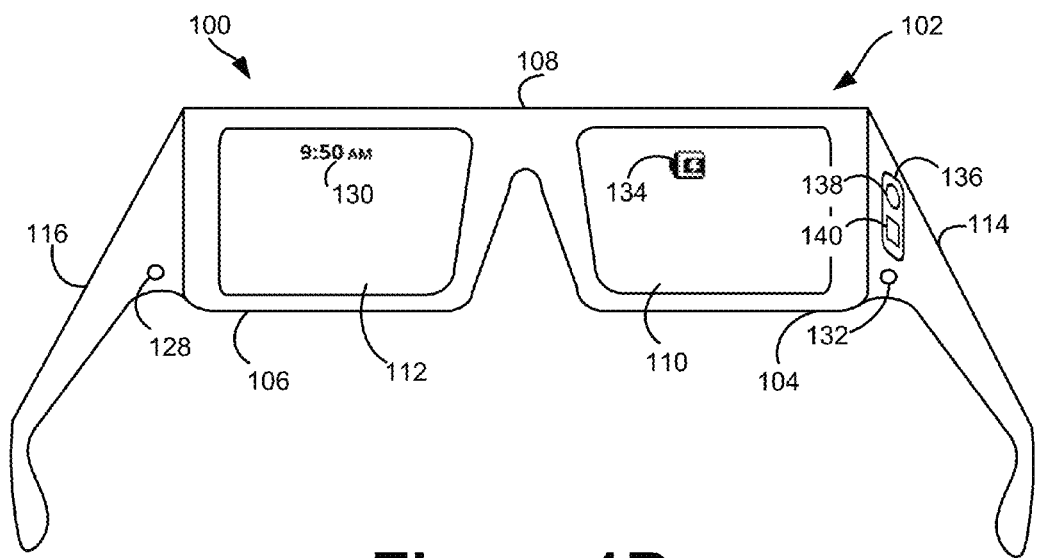

FIG. 1B illustrates an alternate view of the wearable computing device 100 illustrated in FIG. 1A. As shown in FIG. 1B, the lens elements 110, 112, may act as display elements. The HMD 102 may include a first projector 128 coupled to an inside surface of the extending side arm 116 and configured to project a display 130 onto an inside surface of the lens element 112. A second projector 132 may be coupled to an inside surface of the extending side arm 114 and may be configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (such as, for example, when the projectors 128, 132 are scanning laser devices).

In alternative examples, other types of display elements may also be used. For example, the lens elements 110, 112 themselves may include one or more transparent or semi-transparent matrix displays (such as an electroluminescent display or a liquid crystal display), one or more waveguides for delivering an image to the user's eyes, or one or more other optical elements capable of delivering an in focus near-to-eye image to the user. A corresponding display driver may be disposed within the frame elements 104, 106 for driving such a matrix display. Alternatively or additionally, a laser or LED source and scanning system may be used to draw a raster display directly onto the retina of one or more of the user's eyes.

The eye gesture-detection system 136 is shown in FIG. 1B as a proximity-sensing system including a light source 138 and a light sensor 140 affixed to the extending side arm 114 of the HMD 102. Although the eye gesture-detection system 136 is shown as a proximity-sensing system, other types of eye gesture-detection systems may be used. As discussed below in connection with FIG. 2, an eye gesture-detection system may also include other numbers of light sources (including no light sources) and may include elements other than those shown in the an eye gesture-detection system 136. Additionally, the eye gesture-detection system may be arranged in other ways. For example, the light source 138 may be mounted separately from the light sensor 140. As another example, the eye gesture-detection system 136 may be mounted to other frame elements of the HMD 102, such as, for example, to the lens frames 104 or 106, to the center frame support 108, or to the extending side arm 116.

Figure 1C:
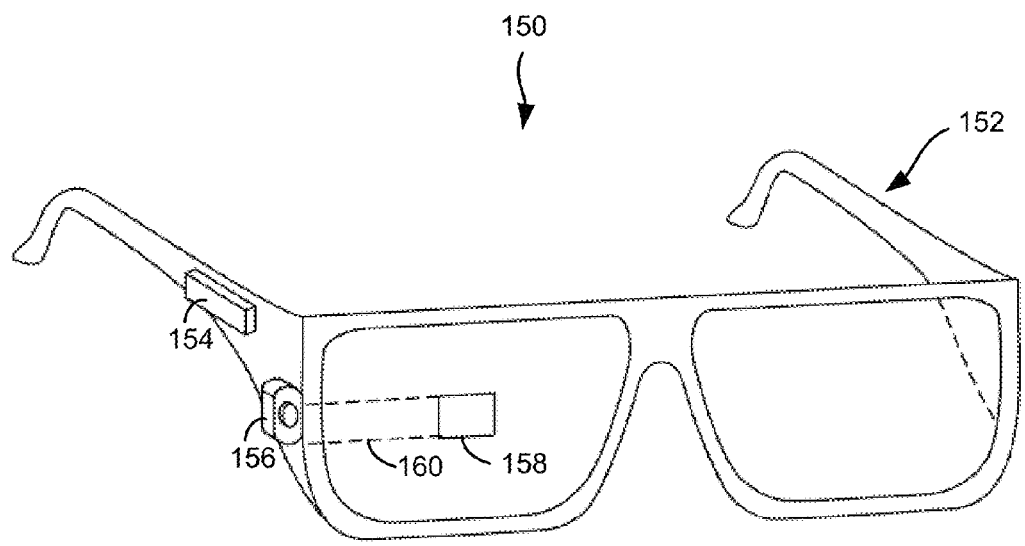
FIG. 1C illustrates another example of a wearable computing device.

FIG. 1C illustrates an example system 150 for receiving, transmitting, and displaying data. The system 150 is shown in the form of an HMD 152. While FIG. 1C illustrates an HMD 152 as an example of a wearable computing device, other types of wearable computing devices may be used. The HMD 152 may include frame elements and side arms such as those discussed above in connection with FIGS. 1A and 1B. The HMD 152 may also include an on-board computing system 154 and a video camera 156, such as those described with respect to FIGS. 1A and 1B. The video camera 156 is shown to be mounted on a frame of the HMD 152; however, the video camera 156 may be mounted at other positions as well.

As shown in FIG. 1C, the HMD 152 may include a single display 158, which may be coupled to the HMD 152. The display 158 may be formed on one of the lens elements of the HMD 152, such as a lens element having a configuration as discussed above in connection with FIGS. 1A and 1B. The display 158 may be configured to overlay computer-generated graphics in the user's view of the physical world. The display 158 is shown to be provided in a center of a lens of the HMD 152; however, the display 158 may be provided in other positions. The display 158 is controllable via the computing system 154, which is coupled to the display 158 via an optical waveguide 160.

Figure 1D:
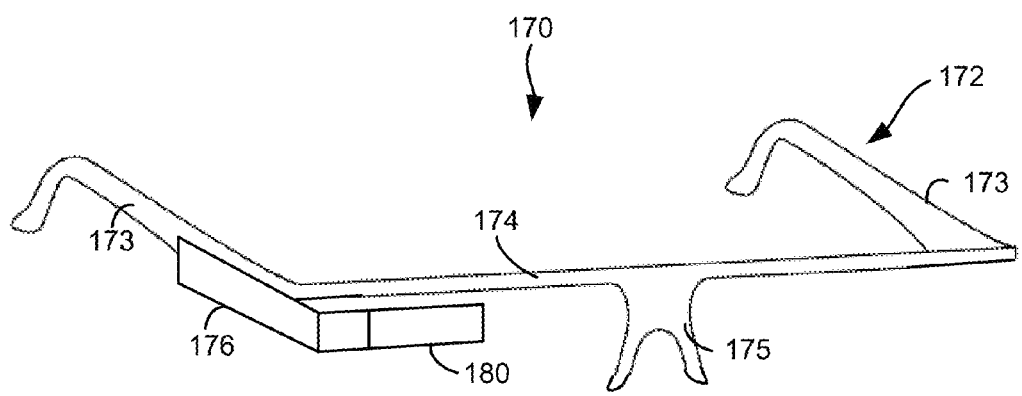
FIG. 1D illustrates an additional example of a wearable computing device.

FIG. 1D illustrates another example system for receiving, transmitting, and displaying data. The wearable computing device 170 may include an image-capturing system and an eye gesture-detection system (not shown in FIG. 1D). The wearable computing device 170 is shown in the form of an HMD 172; however, the wearable computing device 170 may take other forms as well. The HMD 172 may include side arms 173, a center frame support 174, and a bridge portion with a nosepiece 175. In the example shown in FIG. 1D, the center frame support 174 connects the side arms 173. The HMD 172 may not include lens-frames containing lens elements. The HMD 172 may also include an on-board computing system 176 and a video camera 178, such as those discussed above in connection with FIGS. 1A and 1B.

The HMD 172 may include a single lens element 180, which may be coupled to one of the side arms 173 or to the center frame support 174. The lens element 180 may include a display, such as the display discussed above in connection with FIGS. 1A and 1B. The lens element 180 may be configured to overlay computer-generated graphics upon the user's view of the physical world. In an example, the single lens element 180 may be coupled to the inner side (the side exposed to a portion of the head of a user when worn by the user) of the extending side arm 173. The single lens element 180 may be positioned in front of or proximate to an eye of the user when the user wears the HMD 172. For example, the single lens element 180 may be positioned below the center frame support 174, as shown in FIG. 1D.

Figure 2:
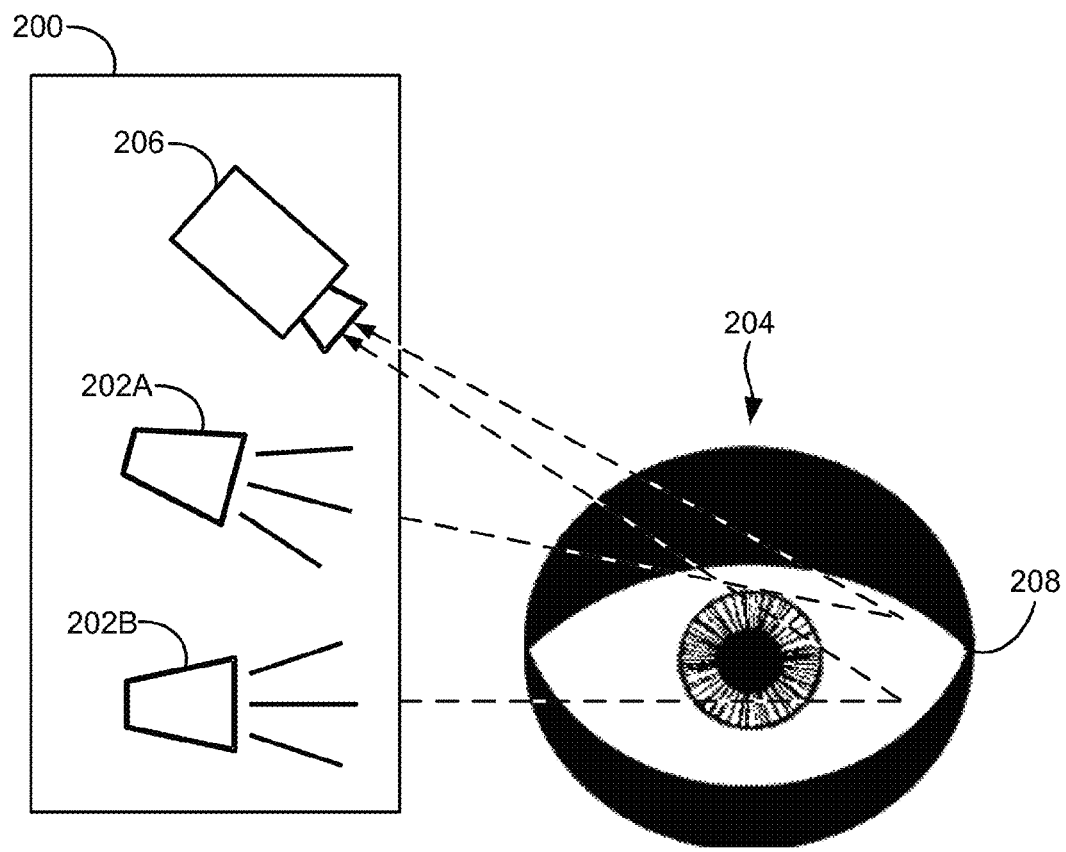
FIG. 2 illustrates an example of an eye gesture-detection system.

FIG. 2 illustrates an example of an eye gesture-detection system 200 interacting with an eye area 204. The eye area 204 may include the eye surface, eyelids, and portions of the face around the eye. The eye gesture-detection system 200 includes two light sources 202A and 202B that are configured to provide light (light shown as dashed lines) to the eye area 204, and a light sensor 206 that is configured to detect reflected light (also shown as dashed lines) from the eye area 204. The eye gesture-detection system 200 may further include a processing unit (not shown in FIG. 2) that may perform computing functions. In particular, the processing unit may control the light sources 202A-B, receive readings from the light sensor 206, may process the readings to determine aspects of the eye area 204, or perform combinations of these functions, among other functions.

The eye gesture-detection system 200 is shown to use two light sources 202A-B to provide light to the eye area 204. While two light sources are shown, in general, an eye gesture-detection system may use any suitable number of light sources to illuminate the eye area. Further, some eye gesture-detection systems include no light sources. Instead, these systems may detect ambient light or other illumination coming from the eye area.

In eye gesture-detection systems using light sources, the light sources may be any type of light source. For example, the light sources may be light-emitting diodes (LEDs), laser diodes, incandescent sources, gas discharge sources, or combinations of these light sources, among other types of light sources. The light sources may be integrated with the system or externally connected to the system, and may be driven by a light sensor or a processing unit. The light sources may emit light of any suitable frequency or intensity. The light sources may emit light at an intensity that is in a range that is safe for the eye of a user. In addition, the light sources may produce light at a wave frequency that renders the light invisible to humans in order to avoid irritating the user. An eye gesture-detection system may use light sources that produce infrared light, near-infrared light, or the like. In some embodiments, an eye gesture-detection system may use visible light or high-intensity light, depending on the desired configuration of the eye gesture-detection system.

In some embodiments, the light sources may be configured to aim at specific portions of the eye area. For example, the light sources 202A-B are configured to aim at an upper portion and a lower portion of the eye, respectively, near an inside corner 208 of the eye. In other cases, a single light source may be configured to illuminate the whole eye area or a part of the eye area, such as, one eyelid or the center of the eye, for example. As another example, several light sources may be configured to each aim at respective various points on the eye area, illuminating the eye at each of the various points. Light sources may also be configured to differ in the amount of the eye area to which they provide light (termed a spot size). For example, one light source may be configured to have a spot size that provides light to the entire eye area, and another light source may focus on a relatively small point on the eye. Further, the shape of the illuminated area may influence the behavior of the system. For example, if a light source illuminates a narrow horizontal area across the top of the eye area, the amount of reflected light may depend on whether the upper eyelid covers that particular height. As another example, a light source that provides light to the entire eye area may allow an eye gesture-detection system to detect the difference between a completely closed eye and an eye that is almost completely closed.

In addition, a light source may be configured to be used as modulated or pulsed light to distinguish that light source from other light sources and from ambient light. In particular, each light source may be configured to pulse at a particular pattern so that the sensor may determine which light source sent the light based on the on/off pattern of the light. Because ambient light may not follow any such pattern, the light from the system's light sources may be distinguished from ambient-light noise by processing the measured light signal. Note that other light characteristics may be used to distinguish between light sources and/or ambient light. Examples of such light characteristics include frequency (color) and intensity of the light.

In some implementations, in an HMD that uses a light source, the light source may include a structured light scanner. The structured light scanner may be configured both to project light onto one or more surfaces, and to detect the light projection at the one or more surfaces. Of course, in some implementations, the structured light scanner may perform one of these functions, and another device or set of devices may perform the other function. When the HMD is worn, the structured light scanner may be aimed at a wearer's eye area. Accordingly, the structured light scanner may project light onto part or all of the eye area. In addition, the structured light scanner may detect the projected light, and based on the deformation of the detected light relative to the projected light, for example, the scanner may calculate information related to the shape of part or all of the eye area. The information may be calculated on a real-time basis. Accordingly, as the wearer's eye shape changes, the real-time information may be used to detect eye gestures.

The HMD need not include a structured light scanner for carrying out structured light scanning; instead, the HMD may include another device or set of devices configured to carry out structured light scanning, whether that device or set of devices is known or has yet to be developed. In addition, the structured light scanning may be performed with respect to light that is not visible to the human eye (such as, for example, infrared light) or with respect to light that is visible to the human eye. In addition, an HMD may include multiple light scanners, for example, to scan areas at and around both of the wearer's eyes. In a different configuration, an HMD may include a single light scanner that is configured to scan areas at and around both of the wearer's eyes.

Further, the light sources may include elements that allow the system to dynamically change the generated light's frequency, intensity, spot size, shape, focus, or combinations of these properties, among other types of properties. In addition, the light sources may couple with one or more mechanical actuators or servos to facilitate changing the light source's position, light direction, or both. In this way, the system may allow for dynamic calibration and adjustments of the light sources.

The light sensor 206 of the eye gesture-detection system 200 is configured to detect light reflected from the eye area 204. As used in this disclosure, the term "reflected" may refer to a variety of interactions between light and an eye area, including those interactions that direct the light toward a light sensor. Examples of such interactions include mirror reflection, diffuse reflection, and refraction, among other scattering processes. The sensor may be any type of light-sensitive element or device that is capable of outputting a measurable change in response to changes in light intensity. For instance, the sensor may be or include a photodiode, an electro-optical sensor, a fiber-optic sensor, or a photo-detector, among other examples. Further, the sensor may be configured to detect a specified frequency of light or a specified range of frequencies. In some implementations, the sensitivity of the sensor may be designed for specified frequencies and intensities of light.

The sensor may be positioned to detect light reflected from particular portions of the eye area. For example, the sensor may be positioned above the eye to detect light reflecting from the top of the eye when the eye is open, and from the upper eyelid when the eye is closed. In this way, the sensor may detect the amount of the eye that the upper eyelid covers. In some embodiments, the light sensor may be aligned at an oblique angle with respect to the eye area (for example, according to the configuration of the sensor 140 shown in FIG. 1B). In other arrangements, the sensor may point directly at the eye area and may be aimed toward the center of the eye area.

In some arrangements, the system may detect light reflected from a second eye area. For example, the system may receive light data from another light sensor, which may detect light from a user's other eye area. Alternatively, one light sensor may be positioned to detect light from both eye areas.

In addition, the system may adjust and calibrate the behavior of the sensor, for example, by changing the sensor's position, direction, frequency response, sensitivity, detectable area size or shape, or combinations of these, among others. This may be performed based on the context in which the system is used—for example, whether the system is calibrated to a particular user, an intensity of ambient light, the light sources used, a battery level of the device, or the like. For example, the sensor may be coupled to mechanical actuators for changing its position and direction. As another example, the sensor may include changeable filters and baffles for filtering out different frequencies of light.

A sensor that detects light from multiple sources may differentiate between the signals from each light source. For example, if the system uses a different pulsing pattern for each light source, then the sensor may separate signals based on the detected pulsing characteristics of detected light. Additionally, the light sources may alternate when they illuminate the eye area. In such an arrangement, the sensor may associate a measurement of light with a source based on which source was on at the time that the light was measured. If the light sources illuminate different sections of the eye area, then the separate signals may be further associated with the respective eye-area portions. In other arrangements, the sensor may measure a single light intensity based on light from all the sources, without differentiating between the sources.

Examples herein may include or use other eye gesture-detection systems that may include one or more cameras configured to capture video or still images of an eye area. Based on the captured video or still images, a system may recognize movements of the eye and eye area and, in particular, may determine eye gestures. A system may use reference signals from previously proper eye gestures. In one embodiment, the system may compare a captured eye gesture with one or more reference signals to determine the proper action to take according to the comparison.

Other eye gesture-detection systems may use mechanical sensors to detect the motion of the eyelids of a user and, from the detected motion, determine that the user is performing an eye gesture. As an example, an eye gesture-detection system may be equipped with an electromyogram or a similar device that is configured to evaluate electrical activity that is produced by skeletal muscles at the wearer's eye area of interest; such a device may be used, in essence, to "hear" movements of muscles at the eye area. As another example, the eye gesture-detection system may be equipped with a vibration detector that is configured to detect relatively subtle vibrations at the wearer's eye area of interest. This disclosure is not limited to the eye gesture-detection systems discussed above; this disclosure contemplates any eye gesture-detection system that is known or has yet to be developed.

A processing unit in the eye gesture-detection system 200 may be a general-purpose processor, a specialized processor, or both. The processor may be integrated with the light sensor or sources, or the processor may connect to the light sensor and sources through a bus or network connection. Further, the processor may include or connect to a non-transitory computer-readable medium, such as a hard disk, a memory core, a memory drive, a server system, or a combination of these, among others. The computer-readable medium may store at least the program instructions for directing the processor to execute the functions associated with any method provided in this disclosure.

The eye gesture-detection system 200 may include various other elements including, for instance, additional processing, sensing, lighting, or interface elements. Some eye gesture-detection systems may include a motion sensor (a gyroscope or an accelerometer, for example) to detect when the system moves. This may enable the system, for example, to determine whether a change in detected light could be due to a movement of the light sensor, with respect to the eye area, as opposed to a movement of the eyes or eyelids.

In some implementations, the eye gesture-detection system 200 may be integrated in or with a computing system, such as the wearable computing systems discussed above in connection with FIGS. 1A-1D. In these implementations, the wearable computing systems may enable a user to interface with the eye gesture-detection system 200, for example, to specify user preferences, change system settings, perform calibration processes, or perform any combination of these functions, among other functions.

Figure 3:
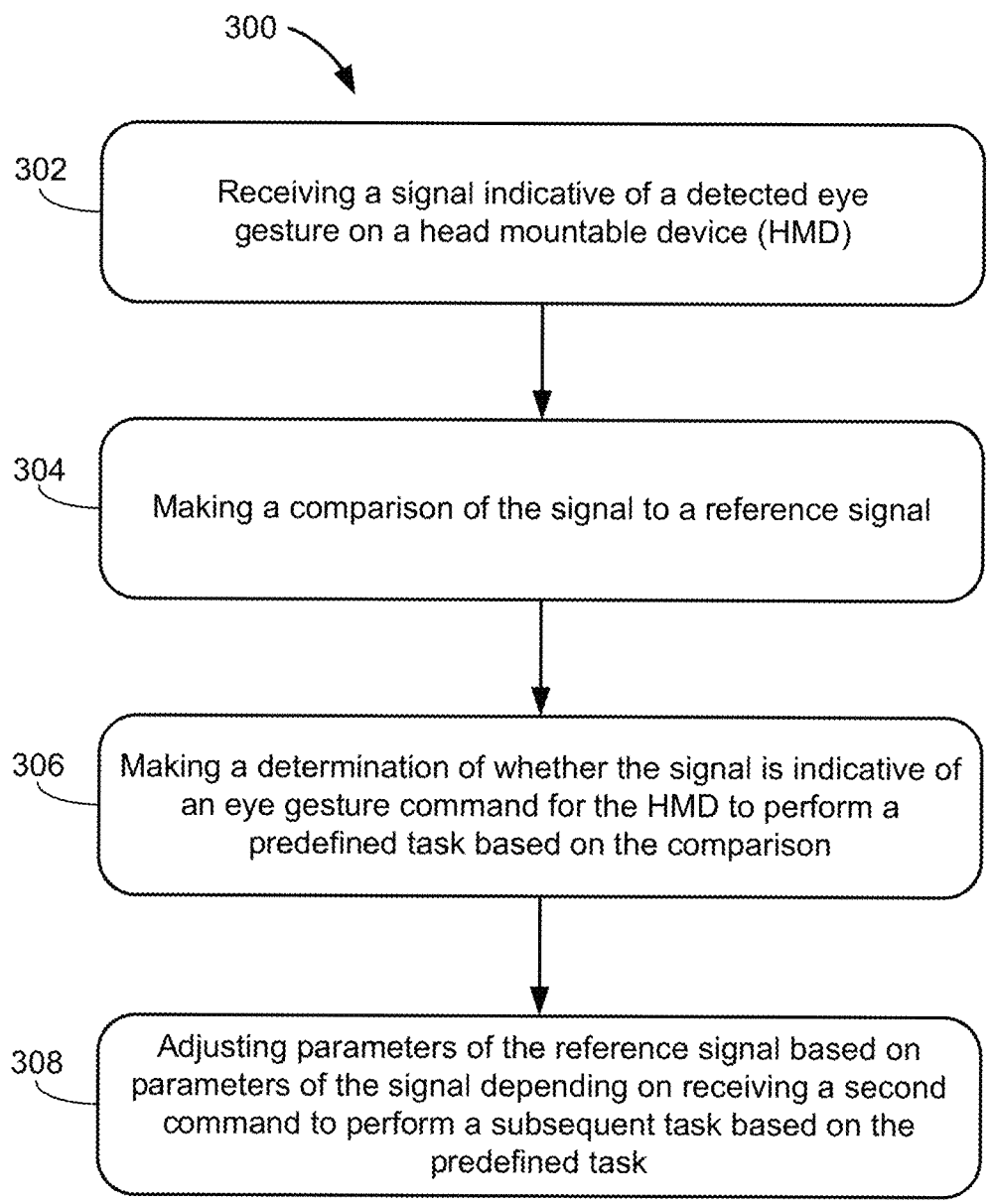
FIG. 3 is a flow chart illustrating an example method for calibrating a system for eye gesture recognition associated with a head-mountable device.

FIG. 3 is a flow chart illustrating an example method for providing calibrations for eye gesture recognition. Method 300 may include one or more operations, functions, or actions as illustrated by one or more of blocks 302-308. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable medium may also be any other volatile or non-volatile storage systems. The computer readable medium may be considered a computer readable storage medium, for example, or a tangible storage device.

Method 300 illustrated in FIG. 3 presents an example of a method that may be performed by a device, such as any devices illustrated in FIGS. 1A-1D, or components of the devices. For example, an HMD may be configured to perform method 300 to calibrate a system for eye gesture recognition to improve execution, efficiency, make minor adjustments, or to fix errors within the system. In another example, an HMD may be configured to perform method 300 to calibrate a system for eye gesture recognition to enhance the level of recognition for signals indicative of eye gesture commands that the wearer may use. In addition, an HMD may be configured to calibrate to account for changes in the orientation of the HMD, such as when the HMD slides down the nose of a wearer, for example. An HMD may be configured to perform method 300 in real-time, a predefined schedule, or in intervals. Furthermore, an HMD may determine whether the HMD is being worn before calibrating the system for eye gesture recognition, since the HMD may be configured to operate differently based on the HMD being worn.

For the sake of example, the method shown in FIG. 3 will be described as implemented by a server in communication with a client device. It should be understood that other entities can implement one or more steps of the example method.

At block 302, the method 300 involves receiving a signal indicative of a detected eye gesture on an HMD. An eye gesture recognition system may be configured to determine signals for received eye gestures for an HMD. Each signal may be representative of various parameters derived from the characteristics and measurements of the detected eye gesture. The different eye gestures may produce signals of different amplitudes, frequencies, and measured ranges, as a result of the various differences in the parameters of the eye gestures. This may be true even when the signals represent different performances of the same eye gesture, except with less variation overall, allowing an HMD to determine that the signals represent the same eye gesture.

An HMD may be configured to detect eye gestures through the use of one or more devices, including the devices discussed in FIG. 2. In one example, an HMD may be able to detect some types of eye gestures more efficiently than other eye gestures. Once an eye gesture is detected, an HMD may be configured to determine a signal from the received eye gesture based on the parameters of the gesture as discussed above. For example, the signal may be determined with the use of image captures, measuring devices, and other types of data extraction methods to find the different time ranges, amplitudes, frequencies, and other parameters of the eye gesture. In one example, a system for eye recognition may first determine the signal from a detected eye gesture before sending that signal to the HMD in real-time. In another example, an HMD may determine the signal from the eye gesture without the use of another device.

At block 304, the method 300 involves making a comparison of the signal to a reference signal. After an HMD receives the signal indicative of the parameters of an eye gesture from a wearer, the HMD may be configured to determine whether this signal represents an actual eye gesture command requiring further action from the HMD, such as performing a task. Thus, an HMD may be configured to compare received signals with reference signals to determine if the received eye gesture was an eye gesture command requiring a task to be performed.

In one example, an HMD may be configured to compare a received signal with one or more reference signals to determine if the received signal is indicative of an eye gesture command. A reference signal represents the parameters of one type of eye gesture command. An HMD may use multiple reference signals stored in memory to represent the various parameters that each eye gesture command produces. Each eye gesture may be represented by a different reference signal due to the various parameters of that eye gesture differing from other eye gestures. Multiple signals may represent the same eye gesture and vary slightly in parameters, but not by a significant amount that the HMD would not be able to recognize all the reference signals representing the same eye gesture. For example, multiple reference signals may represent a hard wink and a soft wink from a wearer. Therefore, an incoming signal indicative of a wink should roughly have the same amplitude, frequency, ranges, etc., as the reference signal representing the wink command. In another example, an HMD may be configured to perform a predefined task, based on other factors, prior to making any comparison between signals. Examples of predefined tasks may include the HMD taking a picture, making a telephone call, looking up directions, or connecting to the Internet, etc.

When comparing the received signal from an eye gesture to reference signals, an HMD may determine if the parameters of the received signals are comparable to a particular reference signal, and thus, determine if the received signal is indicative of an eye gesture command. For example, an HMD may receive a signal from an eye gesture and compare this signal to three different reference signals, each representing different eye gesture commands. In one case, the HMD may determine that the received signal does not closely resemble any of the reference signals to a certain degree, and conclude that the received signal is not indicative of any of the eye gesture commands requiring further execution from the HMD. However, in another case, the HMD may also determine that the received signal compares closely to one of the reference signals, and thus, perform the task of the eye gesture command that the matching reference signal represents.

An HMD may also be configured to recognize one or more reference signals as representing each type of eye gesture command. For example, an HMD may have two reference signals representing the possible range of acceptable parameters for a wink eye gesture command. In the case that the HMD receives a signal from a detected eye gesture with parameters in the possible range of acceptable parameters for a wink command, the HMD may determine that the detected eye gesture is a wink command and executes the predefined task for the wink command.

In addition, an HMD may compare a signal from a detected eye gesture to multiple reference signals. For example, an HMD may compare a signal with the reference signals for a wink command and determine that the signal does not have parameters within the range of the acceptable parameters for a wink eye gesture, but then may determine that the parameters of the signal fall within the range for a double blink command. The HMD may be configured to compare a received signal to multiple reference signals simultaneously in real-time.

At block 306, the method 300 further comprises making a determination of whether the signal is indicative of an eye gesture command for the HMD to perform a predefined task based on the comparison. After the HMD compares the signal from the detected eye gesture to one or more reference signals, the HMD may be configured to determine if the signal represents an eye gesture command based on the results of the comparison. An HMD may be configured to make a determination during each comparison between a received signal and reference signal, or may wait until the received signal has been compared to every reference signal first.

In one example, an HMD may be configured to make a determination that the parameters of received signal are within a predefined threshold with the parameters of a reference signal representing an eye gesture command. The HMD may determine that the signal and reference signal have similar measurements, characteristics, and parameters that warrant the HMD to recognize that the signal is indicative of an eye gesture command. In another example, an HMD may compare the shape of the received signal to the shapes of the reference signals and make a determination based on the similarity of the shapes of the signals. An HMD may use various algorithms to determine whether a received signal from a detected eye gesture matches any reference signals to a predetermined extent.

In one example, an HMD may have different levels of accuracy expectations for different eye gesture types. For example, an HMD may be configured to determine a received signal representing a wink needs to be closely matched with the reference signal for wink eye gestures, but a signal representing a double blink may not have to be as accurate since double blinks do not happen often involuntarily.

In addition, an HMD may determine that the signal is not indicative of an eye gesture command from the results of the comparison, and thus, not perform any task. In these cases, the HMD may have detected noise or an accidental eye gesture from the user rather than an eye gesture command, for example.

At block 308, the method 300 includes adjusting parameters of the reference signal based on parameters of the signal depending on receiving a second command to perform a subsequent task based on the predefined task. At this point in the method 300, an HMD may be configured to perform different types of calibration to the eye gesture recognition system in real-time depending on the type of eye gesture received. The calibration may help the system better detect future eye gesture commands and fix any problems that may have arisen from a change in the orientation of the HMD, for example. Examples of calibration that an HMD may perform include implicit and explicit calibration depending on the type of eye gestures received, since different eye gestures may cause different levels of confidence for the HMD. Implicit calibration may require the HMD to receive additional input from the wearer to confirm the correct reception of the eye gesture command before performing any calibration. Explicit calibration differs for the reason that the eye command received enables the HMD to perform calibration to the system for eye recognition and reference signals without requiring any additional input from the wearer. In addition, an HMD may be configured to perform more calibrations to the system when the confidence level of the HMD is higher as a result of the comparison and based on the eye gesture type. For example, an HMD may adjust several parameters of the reference signal after determining a signal match with a high degree of confidence since the parameters of the received signal closely matched the parameters of the reference signal.

In one example, an HMD may adjust parameters of the reference signal according to the parameters of the received signal. The adjustments may include slight changes to a reference signal, full replacement of the reference signal, or adjusting multiple reference signals for example. In addition, an HMD may be configured to adjust to the various changes in orientation relative to the user that may occur after calibration in real-time. Thus, an HMD may be configured to constantly be updating the system for eye recognition in real-time through calibrations.

In another example, an HMD may be configured to store the received signal in memory as a new reference signal after determining that the received signal is indicative of an eye gesture command. In this example, an HMD may increase the range of acceptable parameters of signals to improve the detection of eye gesture commands and allow the HMD to be configured to separate the commands from system noise or involuntary gestures in real-time. Increase usage of an HMD may cause an HMD to be configured with more reference signals in memory, thus adapting the system to the eye gestures of that particular wearer. In some examples, an HMD may be configured to continuously adjust the parameters of the reference signals stored in memory to reflect the parameters of received signals that the HMD has determined to be indicative of eye gesture commands and use received signals as new reference signals. An HMD may be able to update reference signals simultaneously while also executing predefined tasks in real-time.

In one example for calibration, an HMD may use involuntary blinks to calibrate for the detection of voluntary blinks from a wearer. The HMD may detect if the HMD is currently being worn and as a result, the HMD may use a loose "blink detector" algorithm to detect the natural blinks of the wearer. The detection may be performed by any of the eye gesture-detection systems previously discussed. Based on the parameters and characteristics of the signal for the blink gesture, the HMD may be configured to adjust parameters for other eye gesture-detection systems, such as a long-blink detector or a wink detector. The HMD may perform this process of calibration in the background while running other programs or performing other functions in real-time. In addition, the process may be adaptive including collecting information indicating involuntary blinks from a wearer over time to compensate for any change in orientation of the HMD on the face of the wearer. The HMD may constantly check for blinks all the time in real-time and may rescale signals dynamically. In another example, the HMD may perform this process of calibration immediately when the HMD first detects being placed on the face of a wearer.

In one example of the method 300, an HMD may first wait for the detection of a second command from a wearer prior to making any adjustments to one or more reference signals. The HMD may use this second command from the wearer as confirmation that the HMD had properly determined that the received signal was an eye gesture command and executed the correct predefined task in response. This type of calibration where the HMD waits to receive an additional command from the wearer prior to making any adjustments may be referred to as implicit calibration. Implicit calibration may involve an HMD requiring the input of a second command from a wearer to confirm that the HMD correctly executed according to the recently received eye gesture prior to making any adjustments to the reference signal.

In some examples, additional commands may be considered "secondary gestures." Accordingly, when an eye gesture is discussed in connection with the secondary gesture, the initial eye gesture is sometimes referred to as a "primary eye gesture" for ease of explanation. Depending on the desired implementation, an HMD may be configured to determine that secondary gesture may encompass an intentional gesture (such as, for example, a change in the gaze direction of the wearer), an unintentional gesture (such as, for example, a reflexive blink), or both. In addition, an HMD may determine that a second command may also encompass inactivity, depending on the overall context.

The configuration of the HMD may impact the types of secondary gestures. For example, an HMD configuration may recognize a secondary gesture as an action or a combination of actions that is performed in connection with the HMD. In this HMD configuration, the action or combination of actions is said to serve as the secondary gesture, or in other words, result in a detection of the secondary gesture. Another example is an HMD configuration that may recognize a secondary gesture as inactivity with respect to the HMD. In this HMD configuration, the inactivity serves as the secondary gesture. Yet in another example, the HMD may be configured to recognize a secondary gesture with a suitable action or combination of suitable actions. In this HMD configuration, the combination of inactivity with a suitable action or combination of suitable actions serves as the secondary gesture.

An HMD may permit an eye-related action to serve as a secondary gesture. Several illustrative examples of eye-related actions follow. As a first illustrative example, a squint gesture may serve as a secondary gesture. The squint gesture may include one eye or both eyes performing the squint. In addition, the squint gesture may include one squint or multiple squints. As a second illustrative example, a blink gesture may serve as a secondary gesture. The blink gesture may take the form as discussed below. A blink gesture typically includes a blink of both of the eyes of a wearer, but the blink gesture may also be a blink of just one of the eyes of the wearer. In addition, the blink gesture may include a single blink or multiple blinks; the multiple blinks may include one blink of each of the eyes of the wearer or multiple blinks of the same eye. As a third illustrative example, a change in gaze direction may serve as a secondary gesture. The change in gaze direction may be as discussed above. As a fourth illustrative example, the secondary gesture may take the form of repeating the initial eye gesture.

Some examples in this disclosure discuss situations in which the HMD is configured to prompt the wearer to perform the secondary gesture while or after performing the primary gesture. In these examples, the HMD may detect a primary gesture and the secondary gesture simultaneously.

The configuration of an HMD enables other actions other than eye-related action to serve as the secondary gesture. One example includes a threshold movement of an HMD that may serve as a secondary gesture. The HMD may include a sensor system that is configured to detect the movements of the HMD. The sensor system may include devices such as an accelerometer, a gyroscope, a proximity sensor, or similar devices. Of course, other devices and configurations may be used to detect movements of the HMD. Note that the threshold movement typically occurs when a wearer is wearing the HMD. For example, the HMD may be configured so that a head nod passes the threshold movement requirement and thus, qualifies as the secondary gesture. As a further refinement, a head nod in an initial direction, for example an upward head nod, may serve as the first threshold movement. This head nod may qualify as the secondary gesture. In addition, a second head nod in a different direction may qualify as another command. In this example, the different commands may correspond to different functions of the HMD.

Depending on the configuration of the HMD, the threshold movement may occur as the wearer is removing the HMD or when the HMD is not worn. In another example, a voice command may serve as a secondary gesture. An HMD may be configured to include a voice-command interface. The voice-command interface may enable the HMD to receive voice commands from a wearer.

In another embodiment, the HMD may be configured to receive a secondary gesture via a finger-operable device. The HMD may be equipped with a finger-operable device, such as, for example, the finger-operable touch pad 124 discussed above in connection with FIGS. 1A and 1B. Note that any combination of the actions discussed above may serve as a secondary gesture. In addition, the actions discussed above are illustrative only, so other actions may also serve as secondary gestures.

In addition, the configuration of the HMD may permit inactivity to serve as the secondary gesture. In particular, the HMD may be configured to determine inactivity by itself to serve as the secondary gesture or the inactivity in combination with one or more actions may serve as the secondary gesture. For example, the inactivity may represent a completion of a period in which a wearer of an HMD does not perform a suitable action. In another example, a suitable action, such as a head nod, may start a threshold period. Upon determining that the threshold period has ended without suitable activity, the HMD may determine that the secondary gesture has occurred.

In another example, the HMD may wait to calibrate the eye gesture recognition system until the confidence level of the HMD based on the received eye gesture exceeds a predefined threshold. In addition, an HMD may wait a threshold amount of time for a secondary gesture until the HMD determines that the signal received may not have qualified as properly received. An HMD may also wait to store the received signal as reference stores until the HMD determines that the signal properly indicated of the eye gesture command either implicitly of explicitly. The HMD may be configured to determine false positives when the HMD performs a task that the wearer did not want and thus, the HMD may make adjustments accordingly to the eye gesture recognition system. An HMD may use false positive to detect signal noise and perform calibration in response. In yet another example, the HMD may perform the task after determining that the received signal was derived from an eye gesture command and not attempt to make any adjustments to any reference signals.

Figure 4:
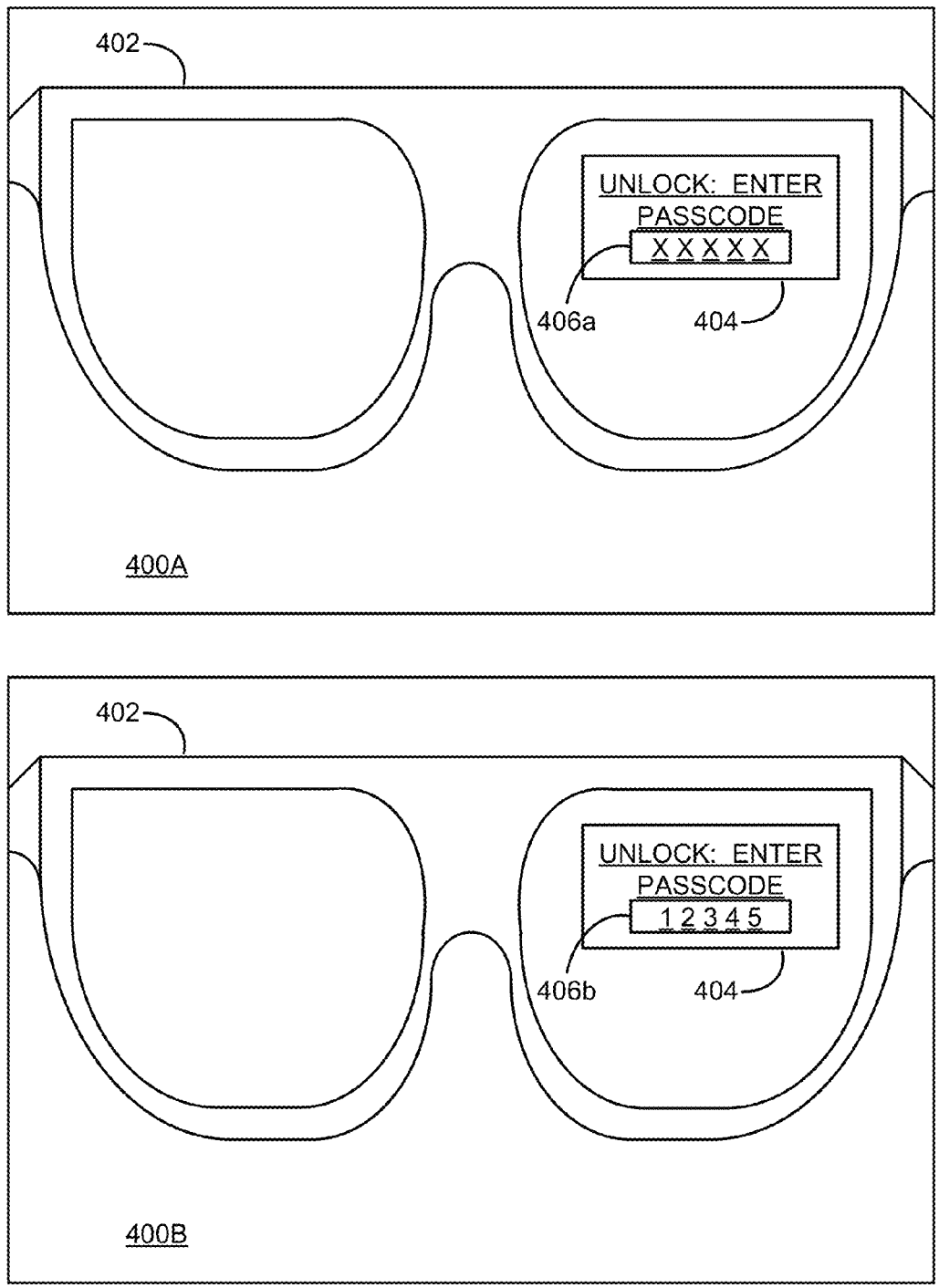
FIG. 4 illustrates an example of the HMD performing implicit calibration.

FIG. 4 illustrates an example for an HMD performing implicit calibration. The example shows HMD 402 in two stages of actions, 400A and 400B. In the example illustrated by FIG. 4, an HMD 402 is shown from the view-point of a wearer in both 400A and 400B. The HMD 402 is first shown in 400A executing a first predefined task to display the unlock screen 404. The HMD 402 may have initiated the unlock screen 404 in response to receiving a specific eye gesture, such as a wink, from the wearer. After detecting the wink, the HMD 402 may have compared the received signal indicative of the parameters of the detected wink with one or more reference signals that represent the various parameters of all the possible eye gesture commands. At this point, the HMD 402 has determined that the signal is representative of a wink command to perform the task associated with receiving a wink. In the example illustrated by FIG. 4, the predefined task is for the HMD 402 to initiate an unlock screen 404 requesting a passcode 406*a* from the wearer. The HMD 402 displays the unlock screen 404 on the lens of the HMD 402, but may display the unlock screen 404 in another manner as discussed by FIGS. 1A-1D.

After displaying this unlock screen 404, the HMD 402 may wait for a secondary gesture to confirm that the HMD 402 had properly detected a wink gesture and executed the correct predefined task. In 400B, the HMD 402 may perform calibration after receiving the passcode 406*b* from the wearer since receiving the passcode 406*b* confirms the HMD was correct to display the lock screen 404 in response to receiving the wink command. Therefore, the HMD 402 received the eye gesture correctly and in response, may calibrate the reference signals and the eye gesture recognition system in real-time updates to reflect this proper reception.

Another example of implicit calibration may involve an HMD receiving a signal indicative of the received eye gesture to execute the predefined task of capturing a photograph. The HMD may implicitly calibrate the eye gesture recognition system by waiting to receive a follow-up command from the wearer to perform a task with the recently captured photograph, such as sharing the photograph online. After receiving this confirmation via the secondary gesture from the wearer that the execution of the HMD was proper, the HMD may adjust one or more parameters of the reference signals to reflect the recently received signal, updating the eye gesture recognition. The HMD may constantly perform this implicit calibration process, using the additional inputs as confirmations or rejections indicating whether the HMD received the eye gesture properly. Additional commands enable an HMD to confirm when the execution of the eye gesture-detection system was proper with real-time execution.

In another example, the HMD may be configured to use multiple repetition of the same eye gesture as a confirmation to perform calibration. The HMD may fail to recognize the first couple repetitions as indicative of an eye gesture command, but may be configured to calibrate the system to recognize the signals repetitions in future cases after receiving additional repetitions from the wearer attempting to command the HMD. For example, an HMD may miss two winks in a row from a wearer, but detect the third wink after the wearer put more emphasis in the winking motion. The HMD may be configured to not only adjust the system for eye gesture recognition to recognize the parameters of the third wink, but also the first two winks since the wearer confirmed that the HMD should have detected the first two winks originally.

Further, in another example of calibration for the eye gesture recognition, a device may be associated with one or more proximity sensors operating in accordance with the device. For example, the proximity sensors may be light emitting diodes (LEDs) or photo detectors or a combination. One or more sensors associated with the device may be configured to perform calibration by selecting a means of calibration according to one or more types of measurement, such as signal-to-noise ratio (SNR), etc., made by the sensors. In addition, a device may be configured to determine which means of calibration to use in the background automatically so as to enable the eye recognition system to adjust accordingly without affecting the operation of the device. For example, a device may perform this process in the background after the device slides down the nose of a wearer without the wearer noticing any differences in the operation of the device. One or more sensors associated with a device may be configured to detect the device sliding down the nose of the wearer. Also, the device may determine that the device is sliding down the nose of the user through other types of measurement by additional sensors and in response, the device may identify a means of calibration according to measurements captured by the sensors.

In addition, a device may be configured to select from various types of calibration in order to find a transformation or filter that may produce a higher confidence match between a received eye gesture signal and a reference signal indicative of an eye gesture command. The device may adjust the type of calibration used as discussed above for veracity. Further, the device may use the confidence determined as a metric for calibration. Other examples may exist as well.

Figure 5:
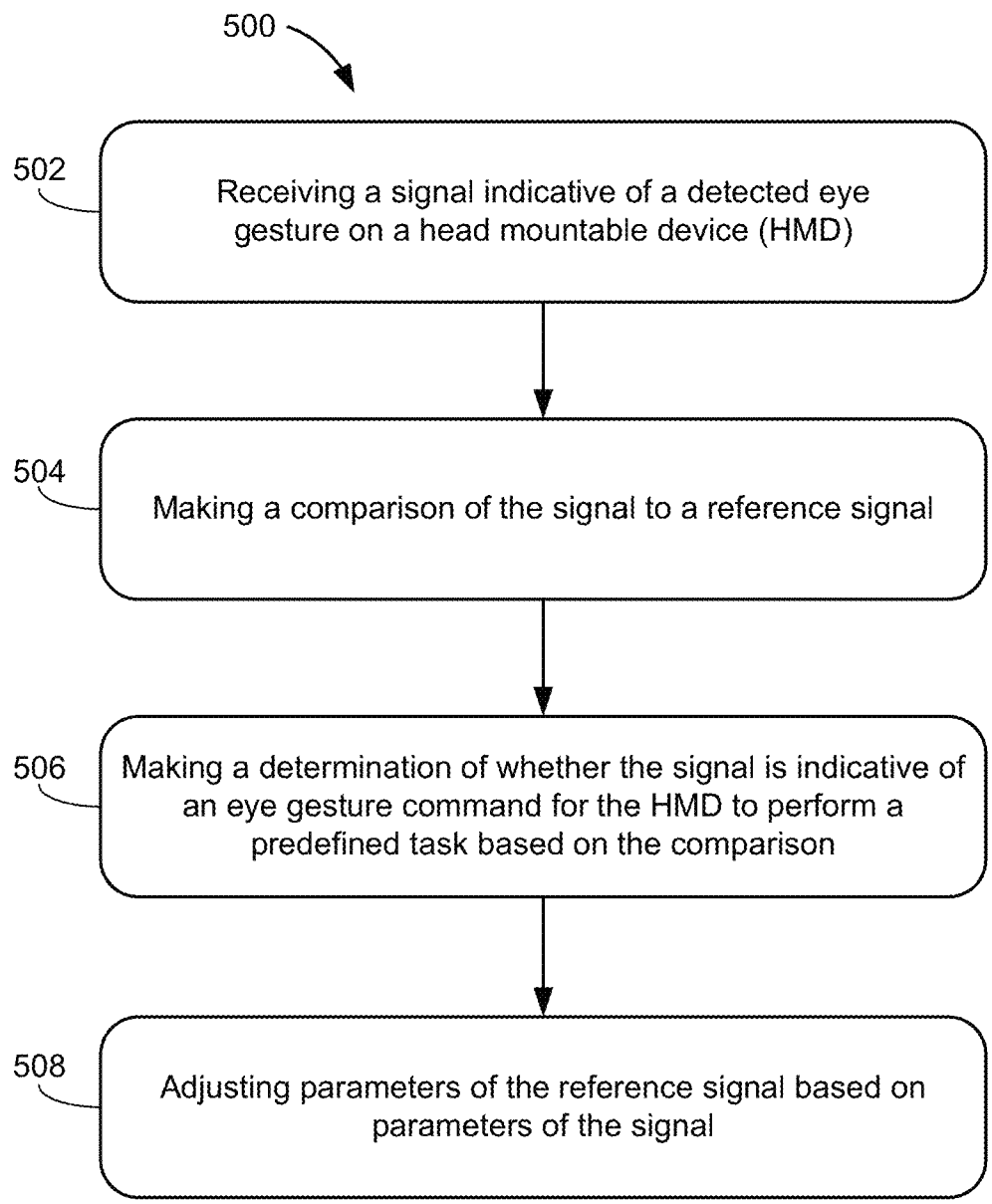
FIG. 5 is a flow chart illustrating an additional example method for calibrating a system for eye gesture recognition associated with a head-mountable device.

FIG. 5 is a flow chart illustrating another example method 500 for providing calibrations for eye gesture recognition. Similar to method 300, method 500 may include one or more operations, functions, or actions as illustrated by one or more of blocks 502-508. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. Blocks 502-506 of method 500 are the same as blocks 302-306 of method 300 as discussed above in FIG. 3.

At block 508, method 500 includes adjusting parameters of the reference signal based on parameters of the signal. Method 500 may not require a secondary gesture from the wearer to confirm that the HMD properly determined that the signal is indicative of an eye gesture command. An HMD may perform method 500 adjusting the parameters of one or more reference signals and the system for eye recognition after making a determination whether the signal is indicative of an eye gesture command for the HMD to perform a predefined task. This type of calibration where the HMD is configured to make any adjustments without waiting for an additional confirmation may be referred to as implicit calibration.

In an example where the HMD performs explicit calibration rather than implicit, an HMD may be configured to calibrate the system for eye recognition without waiting for a secondary gesture for confirmation. Certain eye gestures that do not occur often involuntarily may allow an HMD to immediately recognize that the eye gesture is a command from the wearer. For example, an HMD may detect a double blink from a user and adjust any reference signals indicative of a double blink command to reflect the recently received double blink command, without waiting for confirmation from an additional command to perform a subsequent task. In another example, an HMD may store the signal received from the double blink as an additional reference signal after determining that the HMD needs to execute a command in response to reception of this signal. Thus, an HMD may be configured to perform calibration differently according to the type of eye gesture received.

In an additional example, an HMD may use explicit calibration to calibrate the system for eye gesture recognition immediately after detecting that the HMD was put on by the wearer and the system needs to adapt to the new orientation, for example. An HMD may calibrate other reference signals after receiving high confidence from an eye gesture that allows explicit calibration.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and examples have been disclosed herein, other aspects and examples will be apparent to those skilled in the art. The various aspects and examples disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

The invention claimed is:

1. A method comprising:
   receiving, from a device coupled to a head mountable device (HMD), a signal indicative of a detected eye gesture;
   making a comparison of the signal to a reference signal;
   based on the comparison, making a determination that the signal is indicative of a particular eye gesture command;
   initiating a predefined task in response to the particular eye gesture command;
   subsequent to initiating the predefined task, receiving a second command requesting to perform a subsequent task, wherein the second command corresponds to a physical input and differs from the signal indicative of the particular eye gesture command;
   determining whether the subsequent task includes one or more functions dependent upon the initiation of the predefined task;
   responsive to determining that the subsequent task includes one or more functions dependent on the initiation of the predefined task, determining that the second command confirms the determination that the signal is indicative of the particular eye gesture command; and
   based on determining that the second command confirms the determination that the signal is indicative of the particular eye gesture command, adjusting one or more parameters of the reference signal based on one or more parameters of the signal indicative of the particular eye gesture command.

2. The method of claim 1, wherein making the comparison of the signal to the reference signal comprises determining whether the one or more parameters of the signal is within a threshold of the one or more parameters of the reference signal.

3. The method of claim 1, wherein the signal includes information associated with a length of time and an amplitude of the detected eye gesture and wherein the detected eye gesture includes an involuntary blink, and the method further comprises:
   based on the length of time being indicative of a predetermined type of eye gesture, adjusting an amplitude parameter of the reference signal based on the amplitude of the signal.

4. The method of claim 1, wherein adjusting the one or more parameters of the reference signal comprises calibrating the HMD to be configured to recognize the signal as being indicative of the eye gesture command.

5. The method of claim 1, wherein the predefined task is executed in real-time by the HMD.

6. The method of claim 1, further comprising performing the method based on detecting a change in an orientation of the HMD.

7. The method of claim 1, wherein the predefined task includes initiating an unlock screen, and wherein the second command includes receiving an unlock code.

8. A method comprising:
   receiving, from a device coupled to a head mountable device (HMD), a signal indicative of a detected eye gesture;
   making a comparison of the signal to a reference signal;
   based on the comparison, making a determination that the signal is indicative of a particular eye gesture command;
   in response to the particular eye gesture command, capturing an image with a camera;
   subsequent to capturing the image, receiving a second command requesting to perform a subsequent task, wherein the second command corresponds to a physical input and differs from the signal indicative of the particular eye gesture command;
   determining whether the subsequent task includes one or more functions involving the captured image;
   responsive to determining that the subsequent task includes one or more functions involving the captured image, determining that the second command confirms the determination that the signal is indicative of the particular eye gesture command; and
   based on determining that the second command confirms the determination that the signal is indicative of the particular eye gesture command, adjusting one or more parameters of the reference signal based on one or more parameters of the signal indicative of the particular eye gesture command.

9. The method of claim 8, wherein the detected eye gesture includes a wink.

10. The method of claim 8, wherein the subsequent task includes sharing the captured image.

11. A system comprising:
    a head mountable device (HMD) configured to receive a signal indicative of a detected eye gesture from a device coupled to the HMD;
    a computer-readable medium; and
    program instructions stored on the computer-readable medium and executable by at least one processor to perform functions comprising:
      receiving a signal indicative of a detected eye gesture;
      making a comparison of the signal to a reference signal;
      based on the comparison, making a determination that the signal is indicative of a particular eye gesture command;
      initiating a predefined task in response to the particular eye gesture command; and
      subsequent to initiating the predefined task, receiving a second command requesting to perform a subsequent task, wherein the second command corresponds to a physical input and differs from the signal indicative of the particular eye gesture command;

determining whether the subsequent task includes one or more functions dependent upon the initiation of the predefined task;

responsive to determining that the subsequent task includes one or more functions dependent on the initiation of the predefined task, determining that the second command confirms the determination that the signal is indicative of the particular eye gesture command; and based on determining that the second command confirms the determination that the signal is indicative of the particular eye gesture command, adjusting one or more parameters of the reference signal based on one or more parameters of the signal indicative of the particular eye gesture command.

12. The system of claim 11, wherein the function of making the comparison of the signal to the reference signal comprises determining whether the one or more parameters of the signal is within a threshold of the one or more parameters of the reference signal.

13. The system of claim 11, wherein the signal includes information associated with a length of time and an amplitude of the detected eye gesture and wherein the detected eye gesture includes an involuntary blink, and the functions further comprise:

based on the length of time being indicative of a predetermined type of eye gesture, adjusting an amplitude parameter of the reference signal based on the amplitude of the signal.

14. The system of claim 11, wherein the function of adjusting the one or more parameters of the reference signal comprises calibrating the HMD to be configured to recognize the signal as being indicative of the eye gesture command.

15. The system of claim 11, wherein the predefined task is executed in real-time by the HMD.

16. The system of claim 11, wherein the HMD is configured to perform functions based on detecting a change in an orientation of the HMD.

17. The system of claim 11, wherein the predefined task includes initiating an unlock screen, and wherein the second command includes receiving an unlock code.

18. The system of claim 11, wherein the predefined task includes capturing an image via a camera, and wherein the second command includes sharing the captured image.

19. The system of claim 11, further comprising receiving the second command by receiving an input from a finger-operable touch pad.

20. The system of claim 11, wherein the second command is based on a second signal indicative of the same eye gesture as the detected eye gesture.

21. The system of claim 11, wherein the reference signal is located within a histogram comprising a plurality of reference signals.

22. The system of claim 11, wherein the predefined task includes initiating a lock application for the HMD, and wherein the subsequent task corresponds to an entry of a passcode into the lock application to enable use of the HMD.

* * * * *